(12) United States Patent
Oomori

(10) Patent No.: US 11,495,966 B2
(45) Date of Patent: Nov. 8, 2022

(54) SOLAR POWER GENERATION SYSTEM AND POWER CONDITIONER

(71) Applicant: Murata Manufacturing Co., Ltd., Nagaokakyo (JP)

(72) Inventor: Kenzou Oomori, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 434 days.

(21) Appl. No.: 16/775,324

(22) Filed: Jan. 29, 2020

(65) Prior Publication Data
US 2020/0169217 A1 May 28, 2020

Related U.S. Application Data

(63) Continuation of application No. PCT/JP2018/029444, filed on Aug. 6, 2018.

(30) Foreign Application Priority Data

Aug. 31, 2017 (JP) .............................. JP2017-166748

(51) Int. Cl.
*H02J 3/00* (2006.01)
*H02J 3/38* (2006.01)
*H02S 40/32* (2014.01)

(52) U.S. Cl.
CPC .............. *H02J 3/007* (2020.01); *H02J 3/381* (2013.01); *H02J 2300/26* (2020.01); *H02S 40/32* (2014.12)

(58) Field of Classification Search
CPC ..... H02J 40/32; H02J 3/007; H02J 3/381–385
See application file for complete search history.

(56) References Cited

U.S. PATENT DOCUMENTS

2013/0300449 A1 11/2013 Nakamura et al.
2017/0179723 A1* 6/2017 Chen ....................... H02J 3/381
(Continued)

FOREIGN PATENT DOCUMENTS

CN 101093940 A 12/2007
CN 103973148 A * 8/2014 .............. H02J 3/381
(Continued)

OTHER PUBLICATIONS

Official Communication issued in International Patent Application No. PCT/JP2018/029444, dated Oct. 9, 2018.
(Continued)

*Primary Examiner* — Sisay G Tiku
(74) *Attorney, Agent, or Firm* — Keating & Bennett, LLP

(57) ABSTRACT

A power conditioner includes a PV converter that generates an output voltage, which is obtained by boosting a direct-current voltage input from a solar panel, an inverter that converts the output voltage of the PV converter into an alternating-current voltage, and a first relay connected between the inverter and a commercial power system. A controller includes a control circuit that controls the entire power conditioner, a control circuit that controls the PV converter, and a control circuit that controls the inverter. In a start process, the control circuit controls activation and deactivation of a DC-DC converter and causes the impedance of a DC-DC converter to change. The control circuit detects an input voltage and an input current of the PV converter and determines whether or not the first relay is to be in a close state according to those values.

15 Claims, 8 Drawing Sheets

(56) References Cited

U.S. PATENT DOCUMENTS

2017/0310112 A1  10/2017  Goasguen
2022/0158540 A1* 5/2022  Zhang ....................... H02J 3/02

FOREIGN PATENT DOCUMENTS

| | | | | |
|---|---|---|---|---|
| CN | 106329567 A | | 1/2017 | |
| CN | 111226364 A | * | 6/2020 | ............ H01H 47/00 |
| CN | 216056456 U | * | 3/2022 | |
| EP | 2760118 A2 | * | 7/2014 | ............ H02M 3/156 |
| EP | 2765472 A1 | * | 8/2014 | ............ H02J 3/385 |
| EP | 2768132 A2 | * | 8/2014 | ............ H02J 3/381 |
| EP | 2 778 824 A2 | | 9/2014 | |
| EP | 3 349 091 A1 | | 7/2018 | |
| JP | 09-135575 A | | 5/1997 | |
| JP | 2009247184 A | * | 10/2009 | |
| JP | 2012-156343 A | | 8/2012 | |
| JP | 2013-102631 A | | 5/2013 | |
| JP | 2013102631 A | * | 5/2013 | |
| JP | 2014155332 A | * | 8/2014 | ............ H02J 3/385 |
| JP | 2014-180182 A | | 9/2014 | |
| JP | 2014180182 A | * | 9/2014 | ............ G05F 1/67 |
| JP | 2015-006117 A | | 1/2015 | |
| JP | 2015186427 A | * | 10/2015 | |
| JP | 2016-073204 A | | 5/2016 | |
| JP | 2017-054273 A | | 3/2017 | |
| JP | 2018191447 A | * | 11/2018 | |
| KR | 2014095968 A | * | 8/2014 | ............ H02J 3/381 |
| WO | 2016/087781 A1 | | 6/2016 | |
| WO | 2017/043197 A1 | | 3/2017 | |
| WO | WO-2017043197 A1 | * | 3/2017 | ............ G05F 1/66 |
| WO | WO-2019077958 A1 | * | 4/2019 | ............ H01H 47/00 |

OTHER PUBLICATIONS

Official Communication issued in corresponding Chinese Patent Application No. 201880054864.8, dated Apr. 1, 2021.

* cited by examiner

SOLAR POWER GENERATION SYSTEM AND POWER CONDITIONER

CROSS REFERENCE TO RELATED APPLICATIONS

This application claims the benefit of priority to Japanese Patent Application No. 2017-166748 filed on Aug. 31, 2017 and is a Continuation Application of PCT Application No. PCT/JP2018/029444 filed on Aug. 6, 2018. The entire contents of these applications are incorporated herein by reference.

BACKGROUND OF THE INVENTION

1. Field of the Invention

The present invention relates to solar power generation systems and power conditioners.

2. Description of the Related Art

In general, a power conditioner to be connected to a solar panel includes an inverter unit that converts direct-current power of the solar panel into alternating-current power and a system linkage relay that supplies the alternating-current power to an indoor alternating-current load. Although drive power of the power conditioner may be obtained from a commercial power system, given the need of autonomous operation during a disaster and the like, it is desirable to obtain the drive power of the power conditioner from output power of the solar panel. However, in such a system, the power conditioner stops when the output power of the solar panel falls below the power necessary for operation of the power conditioner. The power conditioner that has been started closes (turns on) the system linkage relay, which is thrown at the time of linking with a commercial power system, and supplies alternating-current power to an indoor alternating-current load. When the power conditioner stops, the system linkage relay opens (turns off).

In specific times of day such as sunrise and the like, because it was nighttime until such time periods, the power generation of the solar panel was substantially zero. Thus, the power conditioner was stopped, and the system linkage relay opened (turned off). However, as the sun rises, sunlight starts shining on the solar panel, and the power starts to be generated gradually. When the open-circuit voltage of the solar panel becomes equal to or beyond a certain value, the power conditioner starts the operation. However, when the output power of the solar panel is not sufficient, because of the start of the power conditioner, the output power of the solar panel falls below the voltage necessary for operation of the power conditioner, and the power conditioner stops. When the power conditioner stops, the output power of the solar panel increases to the open-circuit voltage, and thus the power conditioner starts again. Accordingly, when the output power of the solar panel is not sufficient, the power conditioner repeats start and stop. In other words, the power conditioner starts uselessly. Because of this, even though a commercial power system is not linked, the system linkage relay repeats closing and opening uselessly. Such useless opening and closing causes noise at the system linkage relay and shortens its mechanical life.

In view of the above, a device is proposed (for example, see Japanese Unexamined Patent Application Publication No. 2017-54273). In this device, an inverter unit converting direct-current power to alternating-current power is operated so as to perform a start determination using a direct-current voltage value at the time that a resistive load of the inverter unit is consuming power.

When the start determination is performed using a resistive load as described above, the efficiency decreases if the resistance value of the resistive load is smaller. Thus, it is preferable to have a larger resistance value. However, if the resistive load having a larger resistance value is used, the value of the direct-current voltage at the time of consuming power is smaller, and the start determination becomes unstable. Thus, again, there is the possibility that the power conditioner starts uselessly. Such useless starts and stops of the power conditioner cause useless opening and closing of the system linkage relay, and thus cause noise at the system linkage relay and shortens its mechanical life.

SUMMARY OF THE INVENTION

Preferred embodiments of the present invention provide solar power generation systems and power conditioners that each make it possible to reduce or prevent useless starts.

A solar power generation system, according to a preferred embodiment of the present disclosure, includes a solar panel, a PhotoVoltaic (PV) converter connected to the solar panel, an inverter that converts a direct-current voltage output from the PV converter to an alternating-current voltage, a first relay that connects and disconnects the inverter to and from a first alternating-current load, to which the alternating-current voltage is supplied, a controller that controls the PV converter and the inverter, and a DC-DC converter that converts the direct-current voltage output from the PV converter into a drive voltage of the controller. In a start process, the controller causes an impedance of the DC-DC converter to change, detects an input voltage and an input current of the PV converter or an output voltage and an output current of the PV converter, and at least determines whether or not the first relay is to be in a close state according to those values.

According to this configuration, by causing the impedance of the DC-DC converter to change, the load for the solar panel, which is power consumption of the solar panel, changes. The output characteristic (current-voltage (I-V) characteristic) of the solar panel is unique to the solar panel. The current-voltage (I-V) characteristic changes depending on the sunlight intensity on the solar panel (the output current and the output voltage of the solar panel change). Accordingly, once a desired output characteristic is obtained, it becomes possible to determine whether or not the entire power conditioner can be operated using the generated power of the solar panel at that time. Accordingly, by detecting the input voltage and the input current of the PV converter at the time of causing the impedance of the DC-DC converter to change and determining whether or not the first relay is to be in the close state according to those values, useless starts can be reduced or prevented, and useless opening and closing of the first relay can be reduced or prevented.

In the foregoing solar power generation system according to a preferred embodiment of the present invention, it is preferable that the first alternating-current load is also connected to a power system.

According to this configuration, by linking the solar power generation system with the power system, if the amount of generated power of the solar panel exceeds power demanded by the first alternating-current load, a reverse power flow to the power system will be used so that surplus power will not be wasted.

It is preferable that the foregoing solar power generation system further includes a second relay that connects and disconnects the inverter to and from a second alternating-current load, to which the alternating-current voltage is supplied.

According to this configuration, by configuring the first relay corresponding to a system linkage relay and the second relay corresponding an autonomous operation relay to be able to switch therebetween, the alternating-current voltage can be supplied to the second alternating-current load by performing the autonomous operation even when the linkage with a power system is cut off by a power outage or the like.

In the foregoing solar power generation system, it is preferable that the controller estimates a generated power of the solar panel from the input voltage and the input current of the PV converter or the output voltage and the output current of the PV converter, compares an estimated generated power with an operational power, and determines whether or not the first relay or the second relay is to be in the close state.

According to this configuration, by detecting the input voltage and the input current of the PV converter, which are the output voltage and the output current of the solar panel, the current-voltage (I-V) characteristic of the solar panel can be calculated. This current-voltage (I-V) characteristic enables estimation of the generated power of the solar panel. When the estimated generated power of the solar panel is less than the operational power, it is determined that the first relay or the second relay is not to be in the close state, that is, an open state is maintained. Therefore, useless starts of the power conditioner can be reduced or prevented, and useless opening and closing of the first relay or the second relay can be reduced or prevented.

In the foregoing solar power generation system, it is preferable that the controller includes a primary control circuit that performs the start process, a first control circuit that controls the PV converter, and a second control circuit that controls the inverter, the DC-DC converter includes a primary converter that generates a drive voltage of the primary control circuit, a first converter that generates a drive voltage of the first control circuit, and a second converter that generates a drive voltage of the second control circuit, and the primary control circuit is a device that controls activation and deactivation of the first converter and the second converter, the primary control circuit causing the impedance of the DC-DC converter to change in the start process by at least controlling activation and deactivation of the first converter.

According to this configuration, by causing the impedance of the DC-DC converter to change by activating and deactivating the first converter, the generated power of the solar panel can be determined. Further, by controlling activation and deactivation of the first converter and the second converter, the amount of change in the impedance of the DC-DC converter can be increased, and estimation accuracy of the generated power of the solar panel can be increased.

It is preferable that the foregoing solar power generation system further includes a bidirectional DC-DC converter, a first terminal of the bidirectional DC-DC converter being connected to a direct-current voltage bus arranged between the PV converter and the inverter; and an electric storage device connected to a second terminal of the bidirectional DC-DC converter.

According to this configuration, when the generated power of the solar panel is less than the operational power of the power conditioner, the inverter is activated by activating the bidirectional DC-DC converter and using a discharge voltage from the electric storage device. Further, by converting the discharge voltage from the electric storage device into an alternating-current voltage using the inverter, the alternating-current voltage can be supplied to a load.

In the foregoing solar power generation system, it is preferable that when the generated power of the solar panel is less than the operational power, the controller deactivates the PV converter and outputs, to the direct-current voltage bus, a direct-current voltage based on a storage voltage of the electric storage device by activating the bidirectional DC-DC converter.

According to this configuration, when the generated power of the solar panel is less than the operational power of the power conditioner, the inverter is activated by activating the bidirectional DC-DC converter and using a discharge voltage from the electric storage device. Further, by converting the discharge voltage from the electric storage device into an alternating-current voltage using the inverter, the alternating-current voltage can be supplied to a load.

A power conditioner according to a preferred embodiment of the present disclosure, is a power conditioner that converts a direct-current voltage input from a solar panel into an alternating-current voltage and outputs to a first alternating-current load, the power conditioner including a PV converter connected to the solar panel, an inverter that converts a direct-current voltage output from the PV converter to an alternating-current voltage, a first relay that connects and disconnects the inverter to and from the first alternating-current load, a controller that controls the PV converter and the inverter, and a DC-DC converter that converts the direct-current voltage output from the PV converter into a drive voltage of the controller. In a start process, the controller causes an impedance of the DC-DC converter to change, detects an input voltage and an input current of the PV converter or an output voltage and an output current of the PV converter, and at least determines whether or not the first relay is to be in a close state according to those values.

According to this configuration, by causing the impedance of the DC-DC converter to change, the load for the solar panel, which is power consumption of the solar panel, changes. The output characteristic (current-voltage (I-V) characteristic) of the solar panel is unique to the solar panel. The current-voltage (I-V) characteristic changes depending on the sunlight intensity on the solar panel (the output current and the output voltage of the solar panel) change. Accordingly, once a desired output characteristic is obtained, it becomes possible to determine whether or not the entire power conditioner can be operated using the generated power of the solar panel at that time. Accordingly, by detecting the input voltage and the input current of the PV converter at the time of causing the impedance of the DC-DC converter to change and determining whether or not the first relay is to be in the close state according to those values, useless starts can be reduced or prevented, and useless opening and closing of the first relay can be reduced or prevented.

In the foregoing power conditioner, it is preferable that the first alternating-current load is also connected to a power system.

According to this configuration, the operation is not performed in a state (off-grid) of being completely cut off from a power system. A linked operation in which a power system is linked is always employed, and the operation of the power conditioner is stopped at the time of a power outage.

It is preferable that the foregoing power conditioner further includes a second relay that connects and disconnects the inverter to and from a second alternating-current load, to which the alternating-current voltage is supplied.

According to this configuration, when there is no trouble in a power system, a system linked operation is used. At the time of the power outage, the first relay corresponding to a system linkage relay is opened to cut off the system linkage and perform the autonomous operation, and further the second relay is closed to enable the second alternating-current load to operate. Note that the second alternating-current load is preferably connected to an electric plug for autonomous operation, which is connected to the second relay. This enables the second alternating-current load to receive self-generated power through the electric plug for autonomous operation, which is a separate electric plug.

It is preferable that the foregoing power conditioner further includes a bidirectional DC-DC converter, a first terminal of the bidirectional DC-DC converter being connected to a direct-current voltage bus arranged between the PV converter and the inverter, a second terminal of the bidirectional DC-DC converter being connected to an electric storage device.

According to this configuration, when the generated power of the solar panel is less than the operational power of the power conditioner, the inverter is activated by activating the bidirectional DC-DC converter and using a discharge voltage from the electric storage device. Further, by converting the discharge voltage from the electric storage device into an alternating-current voltage using the inverter, the alternating-current voltage can be supplied to a load.

The solar power generation systems and the power conditioners of preferred embodiments of the present invention enable a reduction or prevention of useless starts.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, a first preferred embodiment of the present invention will be described.

Figure 1:
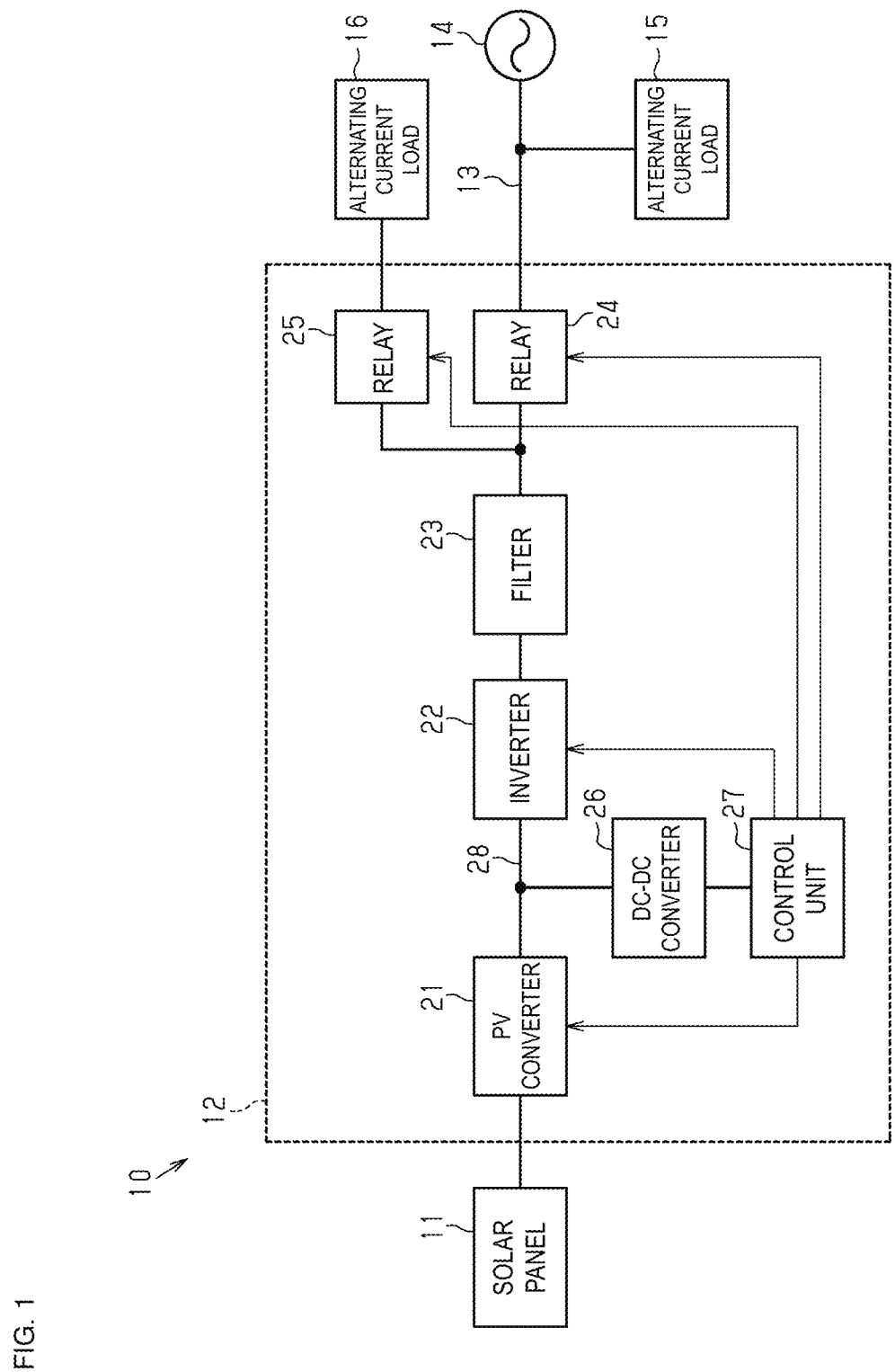
FIG. 1 is a schematic configuration diagram of a solar power generation system of a first preferred embodiment of the present invention.

As illustrated in FIG. 1, a solar power generation system 10 of the present preferred embodiment preferably includes a solar panel 11 and a power conditioner 12 connected to the solar panel 11. In the present preferred embodiment, the power conditioner 12 is connected to a commercial power system 14 via a power line 13. The commercial power system 14 is preferably a distribution system with which an electric power company transmits power. A first alternating-current load 15 is connected to the power line 13. The first alternating-current load 15 is preferably, for example, an indoor load connected to a distribution board. The indoor load may be, for example, electrical equipment in an ordinary house such as a light, a refrigerator, a washing machine, an air conditioner, a microwave oven, or the like. Further, a second alternating-current load 16 is connected to the power conditioner 12. The second alternating-current load 16 is preferably a load selected in advance from among the electrical equipment and may be electrical equipment such as a light or the like. Note that the second alternating-current load 16 may alternatively be electrical equipment such as a refrigerator connected to an electric plug (outlet) for autonomous operation, which is not illustrated in the drawing. The outlet used in autonomous operation is connected to the power conditioner 12. The aforementioned first alternating-current load 15 and second alternating-current load 16 may alternatively be electrical equipment in a commercial facility or a factory.

The power conditioner 12 converts direct-current power generated at the solar panel 11 into alternating-current power and outputs the alternating-current power. Further, the power conditioner 12 links or disconnects the solar panel 11 to or from the commercial power system 14.

The power conditioner 12 preferably includes a PV converter 21, an inverter 22, a filter 23, a first relay (simply referred to as "relay") 24 corresponding to a system linkage relay, a second relay (simply referred to as "relay") 25 corresponding to an autonomous system relay, a DC-DC converter 26, and a controller 27. The PV converter 21, the inverter 22, and the DC-DC converter 26 are connected to each other via a direct-current voltage bus 28. The controller 27 controls the PV converter 21, the inverter 22, the first relay 24, and the second relay 25.

The PV converter 21 is preferably, for example, a step-up chopper circuit that operates based on a control signal from the controller 27, boosts a direct-current voltage input from the solar panel 11, and outputs a boosted direct-current voltage. The inverter 22 is a direct-current-and-alternating-current conversion circuit that operates based on a control signal from the controller 27 and converts the output voltage of the PV converter 21 into an alternating-current voltage. The filter 23 reduces a high frequency component of the alternating-current power output from the inverter 22.

The DC-DC converter 26 is preferably, for example, a step-down circuit and converts a direct-current voltage of the direct-current voltage bus 28 into a direct-current voltage suitable for operation of the controller 27. The controller 27 operates based on a direct-current voltage supplied from the DC-DC converter 26 and controls the PV converter 21, the inverter 22, the first relay 24, and the second relay 25.

The first relay 24 is preferably, for example, an electromagnetic relay of normally open type, and the controller 27 controls a close state and an open state using a control signal. The first relay 24 connects and disconnects the inverter 22 to and from the first alternating-current load 15. The solar power generation system 10 (solar panel 11) and the commercial power system 14 are linked by closing the first relay 24 and are disconnected by opening the first relay 24.

The second relay 25 is preferably, for example, an electromagnetic relay of normally open type, and the controller 27 controls a close state and an open state using a control signal. The second relay 25 connects and disconnects the inverter 22 to and from the second alternating-current load 16. With closing the second relay 25, the power conditioner 12 (controller 27) enables the autonomous operation in which the second alternating-current load 16 is operated using the generated power of the solar panel 11. Note that during the autonomous operation, the power conditioner 12 (controller 27) opens (turns off) the first relay 24.

The controller 27 determines whether or not there is a power outage in the commercial power system 14. The power line 13 is preferably includes a voltage sensor (not illustrated in the drawing) and, based on a detection result of that voltage sensor, the controller 27 determines whether or not there is a power outage in the commercial power system 14. The controller 27 performs a switching control in which a linked operation and the autonomous operation are switched based on the determination as to whether or not there is a power outage in the commercial power system 14. The controller 27 performs the linked operation when there is no power outage in the commercial power system 14 and switches from the linked operation to the autonomous operation when there is a power outage in the commercial power system 14. When the commercial power system 14 is restored from the power outage, the controller 27 switches from the autonomous operation to the linked operation. When switching from the linked operation to the autonomous operation, the controller 27 controls the first relay 24 in such manner as to bring the power conditioner 12 and the commercial power system 14 into a disconnected state and put the second relay 25 into the closed state. When switching from the autonomous operation to the linked operation, the controller 27 controls the first relay 24 in such a manner as to bring the power conditioner 12 and the commercial power system 14 into a linked state and put the second relay 25 into the opened state.

Figure 2:
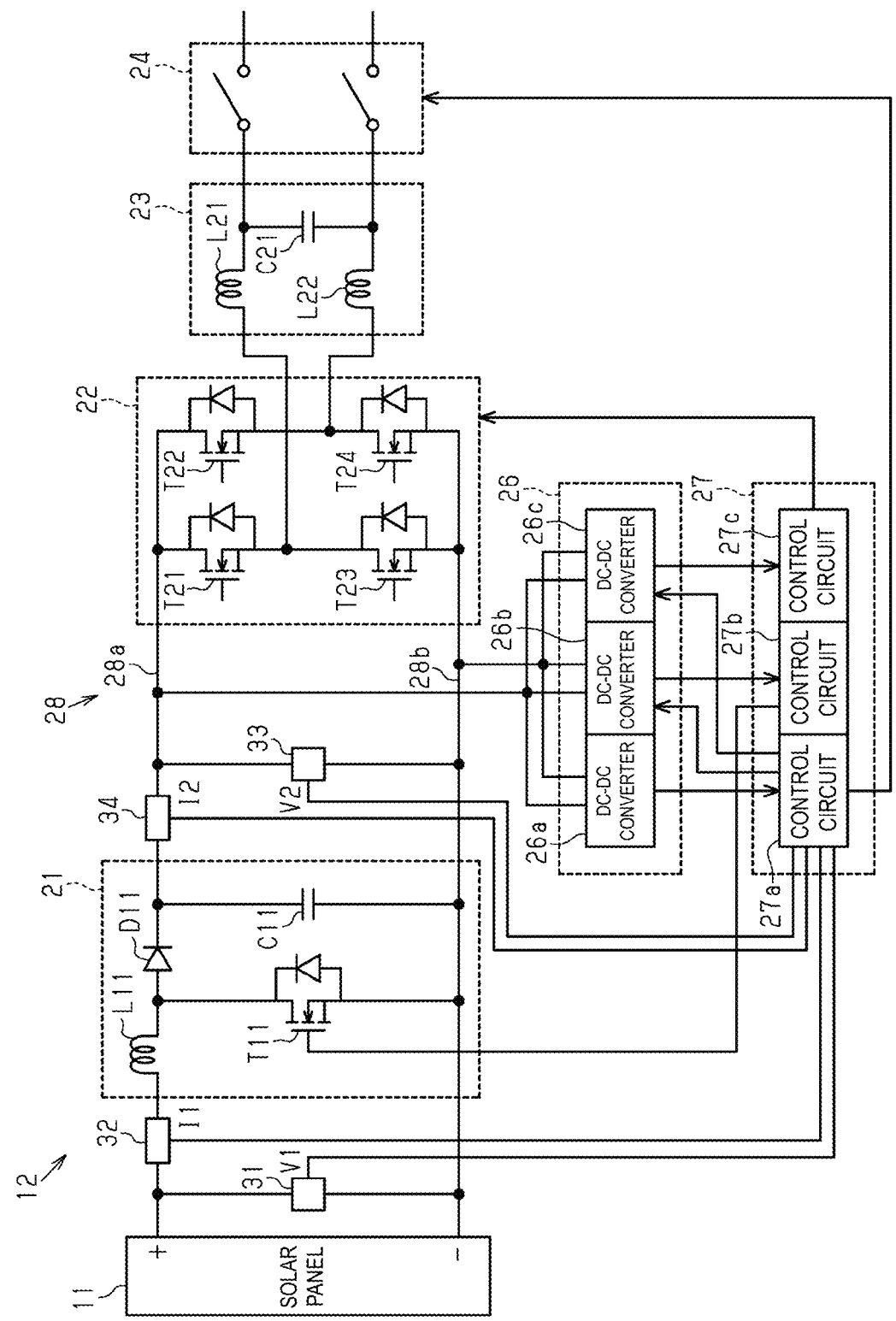
FIG. 2 is a schematic circuit diagram illustrating a power conditioner of the first preferred embodiment of the present invention.

As illustrated in FIG. 2, a positive-electrode terminal and a negative-electrode terminal of the solar panel 11 are connected to the PV converter 21. Output terminals of the PV converter 21 are connected to a high-voltage side wire 28a and a low-voltage side wire 28b of the direct-current voltage bus 28.

The PV converter 21 includes an inductor L11, a transistor T11, a diode D11, and a smoothing capacitor C11. A first terminal of the inductor L11 is connected to the positive-electrode terminal of the solar panel 11, and a second terminal of the inductor L11 is connected to the transistor T11 and an anode of the diode D11. A cathode of the diode D11 is connected to a first terminal of the smoothing capacitor C11. As the smoothing capacitor C11, for example, an aluminum electrolytic capacitor or a tantalum electrolytic capacitor may preferably be used. The transistor T11 is preferably, for example, a N-channel metal-oxide-semiconductor field-effect transistor (MOSFET). The inductor L11 is connected to a drain terminal of the transistor T11, and a source terminal of the transistor T11 is connected to the negative-electrode terminal of the solar panel 11 and a second terminal of the smoothing capacitor C11. Note that the transistor T11 may alternatively be an insulated gate bipolar transistor (IGBT) or the like.

The PV converter 21 outputs a second direct-current voltage, which is obtained by boosting a first direct-current voltage input from the solar panel 11, to the direct-current voltage bus 28 by turning the transistor T11 on and off in response to a control signal. The smoothing capacitor C11 smooths the second direct-current voltage, which is the output voltage of the PV converter 21.

The inverter 22 preferably includes transistors T21, T22, T23, and T24. The transistors T21 to T24 are preferably, for example, N-channel MOSFETs. Note that as the transistors T21 to T24, IGBTs or the like may alternatively be used. Drain terminals of the transistors T21 and T22 are connected to the high-voltage side wire 28a, source terminals of the transistors T21 and T22 are connected to drain terminals of the transistors T23 and T24, and source terminals of the transistors T23 and T24 are connected to the low-voltage side wire 28b. A connecting point between the source terminal of the transistor T21 and the drain terminal of the transistor T23 and a connecting point between the source terminal of the transistor T22 and the drain terminal of the transistor T24 are connected to the filter 23.

The filter 23 preferably includes, for example, inductors L21 and L22 and a capacitor C21. The filter 23 attenuates a high frequency component of the alternating-current power output from the inverter 22 and makes an output voltage and an output current of the inverter 22 close to sine waves. The first relay 24 and the second relay 25 (see FIG. 1) are connected to the filter 23.

The power conditioner 12 includes voltage sensors 31 and 33 and current sensors 32 and 34. The voltage sensor 31 is installed between input terminals of the PV converter 21. The voltage sensor 31 is installed for detecting an input voltage of the PV converter 21. The voltage sensor 31 outputs a signal associated with the input voltage of the PV converter 21 to the controller 27.

The current sensor 32 is installed, for example, between the positive-electrode terminal of the solar panel 11 and the PV converter 21. The current sensor 32 is installed to detect an input current of the PV converter 21. The current sensor 32 outputs a signal associated with the input current of the PV converter 21 to the controller 27.

The voltage sensor 33 is installed in the direct-current voltage bus 28. The voltage sensor 33 is connected between the high-voltage side wire 28a and the low-voltage side wire 28b of the direct-current voltage bus 28. The voltage sensor 33 outputs a signal associated with a voltage of the direct-current voltage bus 28 to the controller 27.

The current sensor 34 is installed, for example, in the high-voltage side wire 28a of the direct-current voltage bus 28. The current sensor 34 is installed for detecting an output current of the PV converter 21. The current sensor 34 outputs a signal associated with the output current of the PV converter 21 to the controller 27.

The controller 27 of the present preferred embodiment preferably includes a plurality (three in the present preferred embodiment) of control circuits 27a, 27b, and 27c. Further, the DC-DC converter 26 includes three DC-DC converters 26a, 26b, and 26c, which respectively correspond to the control circuits 27a, 27b, and 27c.

In the present preferred embodiment, the control circuit 27a is preferably a manager circuit that controls the entire power conditioner. The control circuit 27b is a circuit that controls the PV converter 21. Further, the control circuit 27c is a circuit that controls the inverter 22.

The DC-DC converters 26a to 26c are preferably, for example, step-down circuits of an insulated type. The DC-DC converter 26a is always in operation and supplies a drive voltage, which is obtained by stepping down the direct-current voltage of the direct-current voltage bus 28, to the control circuit 27a. Activation and deactivation of DC-DC converters 26b and 26c are controlled by the control circuit 27a. The activated DC-DC converters 26b and 26c supply drive voltages, which are obtained by stepping down the direct-current voltage of the direct-current voltage bus 28, to the control circuits 27b and 27c, respectively.

The control circuit 27a operates based on the drive voltage supplied from the DC-DC converter 26a and performs a start process, which will be described below. The control circuit 27a controls activation and deactivation of the DC-DC converters 26b and 26c. Further, the control circuit 27a controls activation and deactivation of the control circuits 27b and 27c.

For example, the control circuit 27a outputs a control signal that controls activation and deactivation of the DC-DC converter 26b. The DC-DC converter 26b is activated or deactivated based on that control signal. The activated DC-DC converter 26b generates a drive voltage, which is obtained by stepping down the direct-current voltage of the direct-current voltage bus 28. This drive voltage is supplied to the control circuit 27b.

The control circuit 27a outputs a control signal that controls activation and deactivation of the control circuit 27b. The control circuit 27b becomes operational based on the drive voltage supplied from the DC-DC converter 26b. Further, the control circuit 27b operates based on a control signal input from the control circuit 27a and controls the PV converter 21 based on respective values detected by the voltage sensors 31 and 33 and the current sensors 32 and 34.

For example, the control circuit 27b adjusts the duty cycle of a control signal that turns on and off the transistor T11 of the PV converter 21 using, for example, a pulse width modulation (PWM) control. Further, based on an input voltage V1 and an input current I1, the control circuit 27b performs a maximum power point tracking (MPPT) control that maximizes the output power of the solar panel 11. This enables the PV converter 21 to generate the second direct-current voltage, which is obtained by boosting the first direct-current voltage input from the solar panel 11.

Further, the control circuit 27a outputs a control signal that controls activation and deactivation of the DC-DC converter 26c. The DC-DC converter 26c is activated or deactivated based on that control signal. The activated DC-DC converter 26c generates a drive voltage, which is obtained by stepping down the direct-current voltage of the direct-current voltage bus 28. This drive voltage is supplied to the control circuit 27c.

The control circuit 27a outputs a control signal that controls activation and deactivation of the control circuit 27c. The control circuit 27c becomes operational based on the drive voltage supplied from the DC-DC converter 26c. Further, the control circuit 27c operates based on a control signal input from the control circuit 27a and converts the second direct-current voltage into an alternating-current voltage by controlling the transistors T21 to T24 of the inverter 22.

In the start process, the control circuit 27a determines whether or not the power conditioner 12 can be operated. The operation of the power conditioner 12 is to generate alternating-current power based on the generated power of the solar panel 11 and outputs the alternating-current power. In other words, the operation of the power conditioner 12 includes activating the PV converter 21, activating the inverter 22, and putting the first relay 24 and the second relay 25 into the close state. In order to output the generated alternating-current power, the relay (first relay 24, second relay 25) needs to be put into the close state. Therefore, in the start process, the control circuit 27a at least determines the activation of the relay.

The control circuit 27a causes the impedance of the DC-DC converter 26 to change and detects the output voltage and the output current of the solar panel 11, which are the input voltage V1 and the input current I1 of the PV converter 21. Further, based on a detection result, the control circuit 27a at least determines the activation of the relay.

Specifically, in the present preferred embodiment, the DC-DC converter 26 preferably includes the three DC-DC converters 26a to 26c of insulated type, for example. The DC-DC converter 26a is a device that generates a drive voltage of the control circuit 27a and is always in operation. Activation and deactivation of the DC-DC converters 26b and 26c are controlled by the control circuit 27a. When the DC-DC converters 26b and 26c of insulated type are not in operation, no current flows from the direct-current voltage bus 28 to the DC-DC converters 26b and 26c. Further, when the DC-DC converters 26b and 26c of insulated type are in operation, a current flows from the direct-current voltage bus 28 to the DC-DC converters 26b and 26c. In other words, at early morning time of day when sunrise starts, the DC-DC converters 26b and 26c, which have been deactivated in order to reduce standby power, are activated, and this changes the impedance of the DC-DC converter 26. The change in the impedance of the DC-DC converter 26 causes a change in the PV converter 21, which is the load for the solar panel 11.

In the present preferred embodiment, the control circuit 27a controls activation and deactivation of the DC-DC converter 26b. In this case, the impedance of the DC-DC converter 26, which is the load of the solar panel 11, changes between when one DC-DC converter 26a is in operation and when two DC-DC converters 26a and 26b are in operation, and thus power consumption changes. By causing this impedance (load) to change, the output voltage and the output current of the solar panel 11, which are the input voltage V1 and the input current I1 of the PV converter 21, are detected.

Based on these detection results, the control circuit 27a measures a current-voltage (I-V) characteristic of the solar panel 11. Further, from the current-voltage characteristic, the control circuit 27a estimates the generated power of the solar panel 11.

Figure 4A:
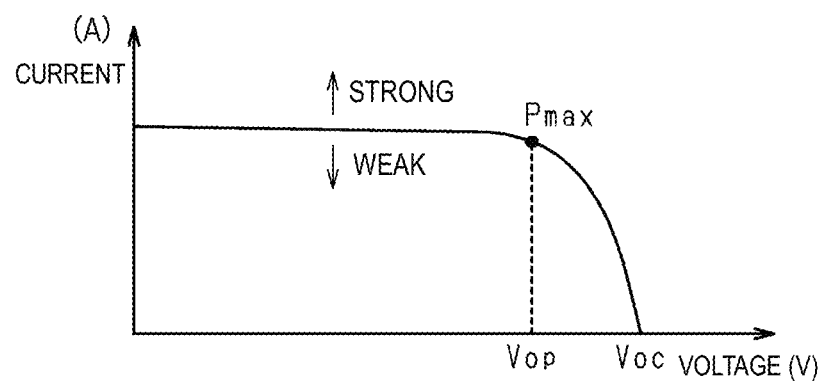
FIG. 4A is a current-voltage (I-V) characteristic diagram of a solar panel.
Figure 4B:
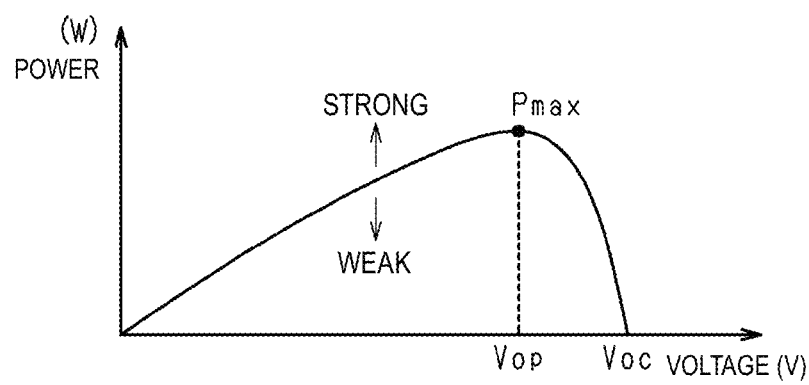
FIG. 4B is a power-voltage (P-V) characteristic diagram of the solar panel.

FIG. 4A illustrates a characteristic between the output current and the output voltage (I-V characteristic) of the solar panel 11, and FIG. 4B illustrates a characteristic between the output power and the output voltage (P-V characteristic) of the solar panel 11. The solar panel 11 starts generating power upon receiving sunlight. The solar panel 11 has a constant current characteristic where the output current is substantially constant in a wide range of the output voltage. In FIG. 4A, at the time when the output current is not flowing (=0), the voltage is at an open-circuit voltage Voc. In FIG. 4B, it is assumed that the point where the output power becomes the maximum is a maximum power point Pmax, and that the output voltage at the maximum power point Pmax is an optimum operation voltage Vop. An output characteristic of the solar panel 11 changes depending on sunlight intensity, surface temperature, and the like. For example, in the current-voltage (I-V) characteristic illustrated in FIG. 4A, the output current increases when the sunlight intensity becomes stronger and decreases when the sunlight intensity becomes weaker. The output power also changes depending on the output current.

The control circuit 27a stores therein data of the characteristics associated with the solar panel 11. The aforementioned current-voltage (I-V) characteristic and power-voltage (P-V) characteristic are unique to the solar panel 11 to be connected. Accordingly, the control circuit 27a stores therein the data of characteristic associated with the solar panel 11 to be connected in advance. The data of characteristic is, for example, table data linking the output voltage, the output current, and the generated power. Note that as the data of characteristic, for example, coefficients of a predetermined function (arithmetic equation) may alternatively be stored.

Based on the stored data of characteristic, the control circuit 27a estimates the generated power of the solar panel 11. Further, the control circuit 27a compares an estimated generated power with a preset operational power. The operational power is set according to the power required to operate the entire power conditioner 12. Further, the operational power is set at a value that includes, as a margin, the amount of change associated with operation of the power conditioner 12, the amount of shift in power consumption due to characteristics of an element or the like, or any similar quantity.

When the estimated generated power of the solar panel 11 is equal to or greater than the operational power, the control circuit 27a determines that the power conditioner 12 can be operated and that the relay (first relay 24, second relay 25) is to be in the close state. Whereas, when the estimated generated power is less than the operational power, the control circuit 27a does not put the relay (first relay 24, second relay 25) into the close state.

The control circuit 27b controls the PV converter 21 in such a way that the maximum power can be obtained from the solar panel 11 and generates the second direct-current voltage, which is obtained by boosting the first direct-current voltage input from the solar panel 11.

Specifically, the control circuit 27b outputs a control signal to the transistor T11 of the PV converter 21, and the transistor T11 is turned on and off based on the control signal. The inductor L11 stores energy based on the power from the solar panel 11 during a turn-on period of the transistor T11. Further, the inductor L11 releases the stored energy during a turn-off period of the transistor T11. This enables the PV converter 21 to boost the input voltage V1 and output the output voltage V2 whose voltage value is higher than that of the input voltage V1.

The ratio (boosting ratio) of the output voltage V2 to the input voltage V1 can be modified by using the turn-on period and the turn-off period of the transistor T11 of the PV converter 21, which are the duty cycle of a control signal supplied to the transistor T11. The control circuit 27b adjusts the boosting ratio, which is the duty cycle of the control signal supplied to the transistor T11 using, for example, a pulse width modulation (PWM) control. Further, based on an input voltage V1 and an input current I1, the control circuit 27b performs a maximum power point tracking (MPPT) control that maximizes the output power of the solar panel 11.

Figure 5:
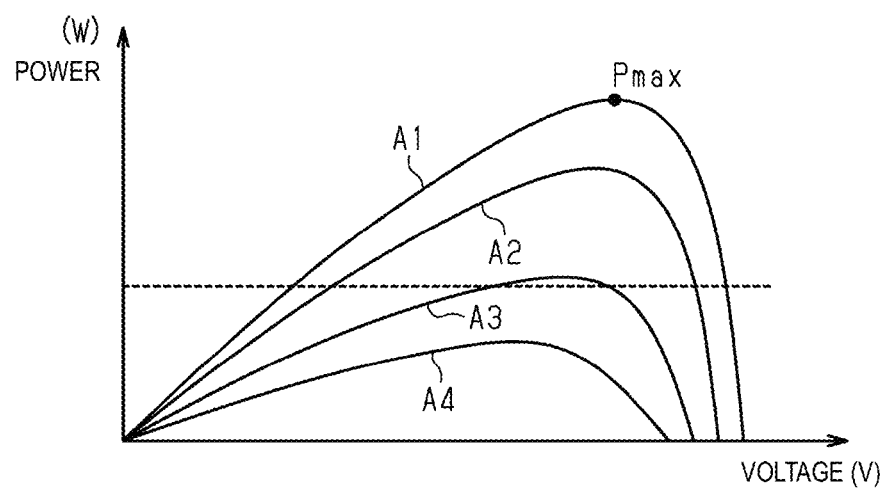
FIG. 5 is an explanatory diagram of a power-voltage (P-V) characteristic of a solar panel with respect to sunlight intensity.

FIG. 5 illustrates an output characteristic (P-V characteristic) with respect to the sunlight intensity. In FIG. 5, of curves A1 to A4, the curve A1 has the strongest sunlight intensity, and the curve A4 has the weakest sunlight intensity. In this way, the output characteristic of the solar panel 11 changes depending on sunlight intensity, surface temperature, and the like. Further, the maximum power point Pmax (optimum operation voltage Vop) changes depending on the sunlight intensity and the like. Therefore, the control circuit 27b controls the input voltage V1 in such a way that the input voltage V1 follows the optimum operation voltage Vop. That is, the control circuit 27b performs a control in which the duty cycle of the control signal that turns on and off the transistor T11 of the PV converter 21 is varied to search the maximum power point Pmax.

The control circuit 27c controls the inverter 22 to convert the second direct-current voltage into an alternating-current voltage. Further, the control circuit 27a puts the first relay 24 into the close state (turns on) and supplies the alternating-current voltage to the first alternating-current load 15 or the commercial power system 14. Further, the control circuit 27a puts the second relay 25 into the close state (turns on) and supplies the alternating-current voltage to the second alternating-current load 16.

Figure 3:
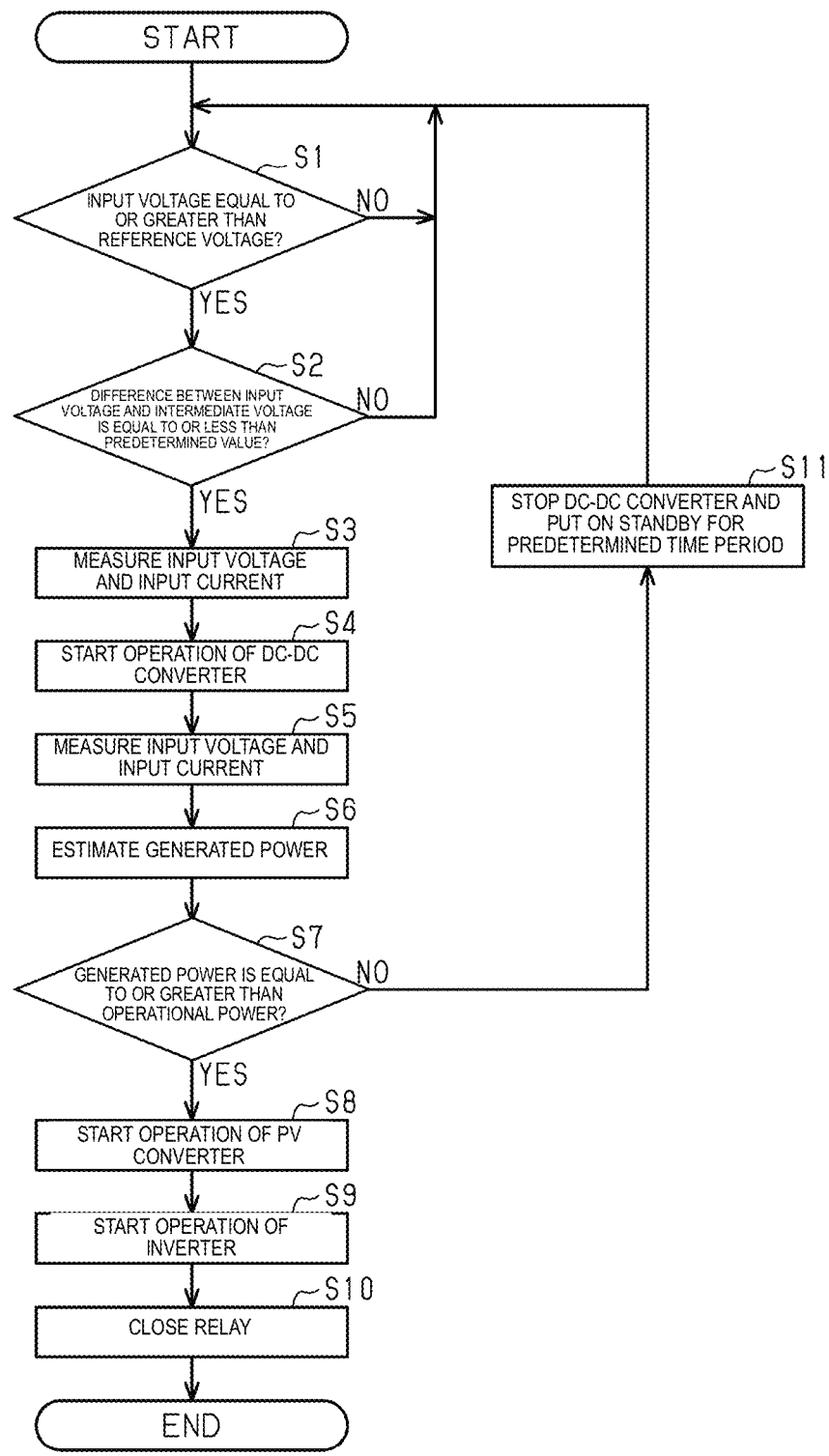
FIG. 3 is a flowchart illustrating a start process of a control circuit according to a preferred embodiment of the present invention.

FIG. 3 illustrates an example of the start process to be performed by the control circuit 27a. The control circuit 27a performs the process of steps S1 to S11 illustrated in FIG. 3. Further, in this process, the control circuit 27a determines activation of the first relay 24. Preconditions for starting the start process are that the DC-DC converters 26b and 26c are not in operation and that the first relay 24 is in the open state. Further, in the present preferred embodiment, the control circuit 27a operates using an operation voltage supplied from the DC-DC converter 26a based on an infinitesimal output power output from the solar panel 11. The solar panel 11 starts generating power upon receiving sun light, for example, at daybreak. When the PV converter 21 illustrated in FIG. 2 is not in operation, the transistor T11 is turned off. Therefore, the output voltage V2 associated with the input voltage V1 of the PV converter 21, more specifically, the output voltage V2 that has passed the inductor L11 and the diode D11 from the input voltage V1, appears on the direct-current voltage bus 28. The DC-DC converter 26a generates a drive voltage for the control circuit 27a based on the voltage of the direct-current voltage bus 28. Accordingly, by the power generation of the solar panel 11, first, the control circuit 27a is activated and performs the start process.

First, at step S1, the control circuit 27a determines whether or not the input voltage V1 is equal to or greater than a reference voltage. When the input voltage V1 is less than the reference voltage, the control circuit 27a returns to step S1, and when the input voltage V1 is equal to or greater than the reference voltage, the control circuit 27a proceeds to step S2.

The reference voltage is set in order to determine whether or not the solar panel 11 outputs a sufficient voltage, that is, whether or not sunlight that the solar panel 11 receives is equal to or greater than a predetermined value. The open-circuit voltage Voc of the solar panel 11 is low when the amount of solar radiation is small, increases as the amount of solar radiation increases, and does not change much when the amount of solar radiation reaches a certain level or more. Further, the output voltage of the solar panel 11, which is the input voltage V1 of the PV converter 21, has a value that is slightly lower than the open-circuit voltage Voc due to the operations of the DC-DC converter 26a and the control circuit 27a. Accordingly, the control circuit 27a determines whether or not there is a certain amount of solar radiation (sunlight intensity) on the solar panel 11 by comparing the magnitude of the input voltage V1 with the magnitude of the reference voltage.

Next, at step S2, the control circuit 27a determines whether or not the difference between the input voltage V1 and an intermediate voltage (output voltage V2) is equal to or less than a predetermined value. When the difference between the input voltage V1 and the intermediate voltage is equal to or less than the predetermined value, the control circuit 27a proceeds to the next step S3, and when the difference is greater than the predetermined value, the control circuit 27a proceeds to step S1.

As described above, when the PV converter 21 is not in operation, the transistor T11 is turned off. Therefore, based on the input voltage V1 of the PV converter 21, the output voltage V2 that has passed the inductor L11 and the diode D11 appears on the direct-current voltage bus 28. Thus, the intermediate voltage is substantially equal to the input voltage V1. At the aforementioned step S1, the control circuit 27a determines whether or not the output voltage of the solar panel 11 (input voltage V1) is equal to or greater than the reference voltage. Accordingly, the input voltage V1 and the intermediate voltage (output voltage V2) are each equal to or greater than the reference voltage. When the voltage of the difference between the input voltage V1 and the intermediate voltage is equal to or greater than the predetermined value, there is the possibility that at least one of the voltage sensor 31 for detecting the input voltage V1 and the voltage sensor 33 for detecting the intermediate voltage (output voltage V2) is not outputting a signal associated with the voltage because of anomaly. Accordingly, at this step S2, the control circuit 27a can determine presence or absence of anomaly in the voltage sensors 31 and 33.

At step S3, the control circuit 27a obtains the input voltage and the input current. Here, it is assumed that V1a and I1a are values of the input voltage and the input current at this time, respectively. At step S4, the control circuit 27a starts the operation of the DC-DC converter 26b illustrated in FIG. 2. The control circuit 27a outputs a control signal to the DC-DC converter 26b, and the DC-DC converter 26b starts the operation based on this control signal. Because of this, in the power conditioner 12, the DC-DC converters 26a and 26b are in operation. Accordingly, compared with the case where only the DC-DC converters 26a is in operation, the power consumption of the power conditioner 12 increases.

At step S5, the control circuit 27a obtains the input voltage and the input current. Here, it is assumed that V1b and I1b are values of the input voltage and the input current at this time, respectively. At step S6, the control circuit 27a calculates the current-voltage (I-V) characteristic of the solar panel 11 based on the input voltage V1a and the input current I1a obtained in the aforementioned step S3 and the input voltage V1b and the input current I1b obtained in the foregoing step S5, and estimates the generated power.

At step S7, the control circuit 27a determines whether or not the generated power of the solar panel 11 is equal to or greater than the operational power. When the generated power is equal to or greater than the operational power, the control circuit 27a determines that the relay (first relay 24, second relay 25) is to be in the close state and proceeds to the next step S8.

At step S8, the control circuit 27a activates the control circuit 27b and starts the operation of the PV converter 21. At step S9, the control circuit 27a activates the control circuit 27c and starts the operation of the inverter 22.

At step S10, the control circuit 27a puts the first relay 24 and the second relay 25 into the close state (turns on). Subsequently, the control circuit 27b controls the PV converter 21 using the MPPT control. The control circuit 27c controls the inverter 22.

At the step S7, the control circuit 27a proceeds to step S11 when the control circuit 27a determines that the generated power is not equal to or greater than the operational power, that is, the generated power is less than the operational power. At the step S11, the control circuit 27a deactivates the DC-DC converter 26b and puts the DC-DC converter 26b on standby for a predetermined time period. Subsequently, the control circuit 27a proceeds to step S1. The standby at this step S11 prevents repetitions of a start determination process within a short period of time.

Next, operations of the solar power generation system 10 will be described.

The solar power generation system 10 includes the solar panel 11 and the power conditioner 12. The power conditioner 12 includes the PV converter 21 that generates an output voltage, which is obtained by boosting a direct-current voltage (input voltage) input from the solar panel 11, the inverter 22 that converts the output voltage of the PV converter 21 into an alternating-current voltage, and the first relay 24 connected between the inverter 22 and the commercial power system 14. The controller 27 preferably includes the control circuit 27a that controls the entire power conditioner 12, the control circuit 27b that controls the PV converter 21, and the control circuit 27c that controls the inverter 22. The DC-DC converter 26 preferably includes the DC-DC converters 26a, 26b, and 26c that generate drive voltages for the corresponding control circuits 27a, 27b, and 27c, respectively. In the start process, the control circuit 27a controls activation and deactivation of the DC-DC converter 26b and causes the impedance of the DC-DC converter 26 and the load for the solar panel 11 to change. Further, the control circuit 27a detects the input voltage V1 and the input current I1 of the PV converter 21 and determines whether or not the first relay 24 is to be in the close state according to those values.

For example, the output characteristic (current-voltage (I-V) characteristic) of the solar panel 11 is unique to the solar panel 11. Accordingly, the current-voltage (I-V) characteristic of the solar panel 11 can be calculated by detecting the input voltage and the input current of the PV converter 21, which are the output voltage and the output current of the solar panel 11. This current-voltage (I-V) characteristic enables estimation of the generated power of the solar panel 11. When the estimated generated power is equal to or greater than the operational power of the power conditioner 12, the control circuit 27a determines that the relay (first relay 24, second relay 25) is to be in the close state. Further, the control circuit 27a and the commercial power system 14 are linked, which means that the control circuit 27a activates the control circuits 27b and 27c. The activated control circuit 27b controls the PV converter 21. The activated control circuit 27c controls the inverter 22. This enables generation of alternating-current voltage based on the generated power of the solar panel 11. Further, this enables turning on the first relay 24 and the second relay 25 and supply the alternating-current voltage to the first alternating-current load 15 and the second alternating-current load 16.

On the other hand, when the estimated generated power of the solar panel 11 is less than the operational power, the control circuit 27a determines that the relay (first relay 24, second relay 25) is not to be in the close state, that is, the open state is maintained. Therefore, the first relay 24 and the second relay 25 do not open and close uselessly.

When it is determined that the relay (first relay 24, second relay 25) is not to be in the close state, the control circuit 27a deactivates the DC-DC converter 26b and puts on standby for a predetermined time period (step S11 in FIG. 3). This standby prevents repetitions of the start process within a short period of time, that is, repetitions of activation and deactivation of the DC-DC converter 26b within a short period of time.

For example, like the daybreak or the like, there is a case where the sunlight intensity on the solar panel 11 increases with time. In this case, when the sunlight intensity is weak and the output power of the solar panel 11 is less than the operational power, the start process of the control circuit 27a enables a reduction or preventions of the useless opening and closing of the first relay 24 and the second relay 25. Further, when the sunlight intensity increases as the sun rises and the output voltage of the solar panel 11 (input voltage V1 of the PV converter 21) exceeds the operational power, the solar panel 11 is generating a sufficient power for linking with the commercial power system 14. Therefore, the control circuit 27a activates the inverter 22 and puts the first relay 24 and the second relay 25 into the close state. This enables the power conditioner 12 to link the solar panel 11 with the commercial power system 14. Further, this enables supply of the alternating-current power generated from the generated power of the solar panel 11 to the first alternating-current load 15 and the second alternating-current load 16.

As described above, the present preferred embodiment produces the following advantageous effects.

(1-1) The solar power generation system 10 includes the solar panel 11 and the power conditioner 12. The power conditioner 12 includes the PV converter 21 that generates an output voltage, which is obtained by boosting a direct-current voltage (input voltage) input from the solar panel 11, the inverter 22 that converts the output voltage of the PV converter 21 into an alternating-current voltage, and the first relay 24 connected between the inverter 22 and the commercial power system 14. The controller 27 includes the control circuit 27a that controls the entire power conditioner 12, the control circuit 27b that controls the PV converter 21, and the control circuit 27c that controls the inverter 22. The DC-DC converter 26 includes the DC-DC converters 26a, 26b, and 26c that generates drive voltages for the corresponding control circuits 27a, 27b, and 27c, respectively. In the start process, the control circuit 27a controls activation and deactivation of the DC-DC converter 26b and causes the impedance of the DC-DC converter 26 and the load for the solar panel 11 to change. Further, the control circuit 27a detects the input voltage V1 and the input current I1 of the PV converter 21 and determines whether or not the first relay 24 is to be in the close state according to those values.

The output characteristic (current-voltage (I-V) characteristic) of the solar panel 11 is unique to the solar panel 11. The current-voltage (I-V) characteristic (i.e., the output current and the output voltage of the solar panel 11) changes depending on the sunlight intensity on the solar panel 11. Accordingly, once a desired output characteristic is obtained, it becomes possible to determine whether or not the entire power conditioner 12 can be operated using the generated power of the solar panel 11 at that time. Accordingly, by detecting the input voltage and the input current of the PV converter 21 when the impedance of the DC-DC converter 26 is caused to change and determining whether or not the relay (first relay 24, second relay 25) is to be in the close state according to those values, the useless starts can be reduced or prevented, and useless opening and closing of the relay (first relay 24, second relay 25) can be reduced or prevented. Accordingly, generation of noise and reduction of mechanical life of the relay (first relay 24, second relay 25) can be reduced or prevented.

(1-2) The current-voltage (I-V) characteristic of the solar panel 11 can be calculated by detecting the input voltage and the input current of the PV converter 21, which are the output voltage and the output current of the solar panel 11. This current-voltage (I-V) characteristic enables estimation of the generated power of the solar panel 11. When the estimated generated power of the solar panel 11 is less than the operational power, it is determined that the relay (first relay 24, second relay 25) is not to be in the close state, that is, the open state is maintained. Therefore, the useless starts of the power conditioner 12 can be reduced or prevented, and useless opening and closing of the first relay 24 and the second relay 25 can be reduced or prevented.

Note that the foregoing first preferred embodiment may be implemented in the following manner.

Modified Example 1

Figure 6:
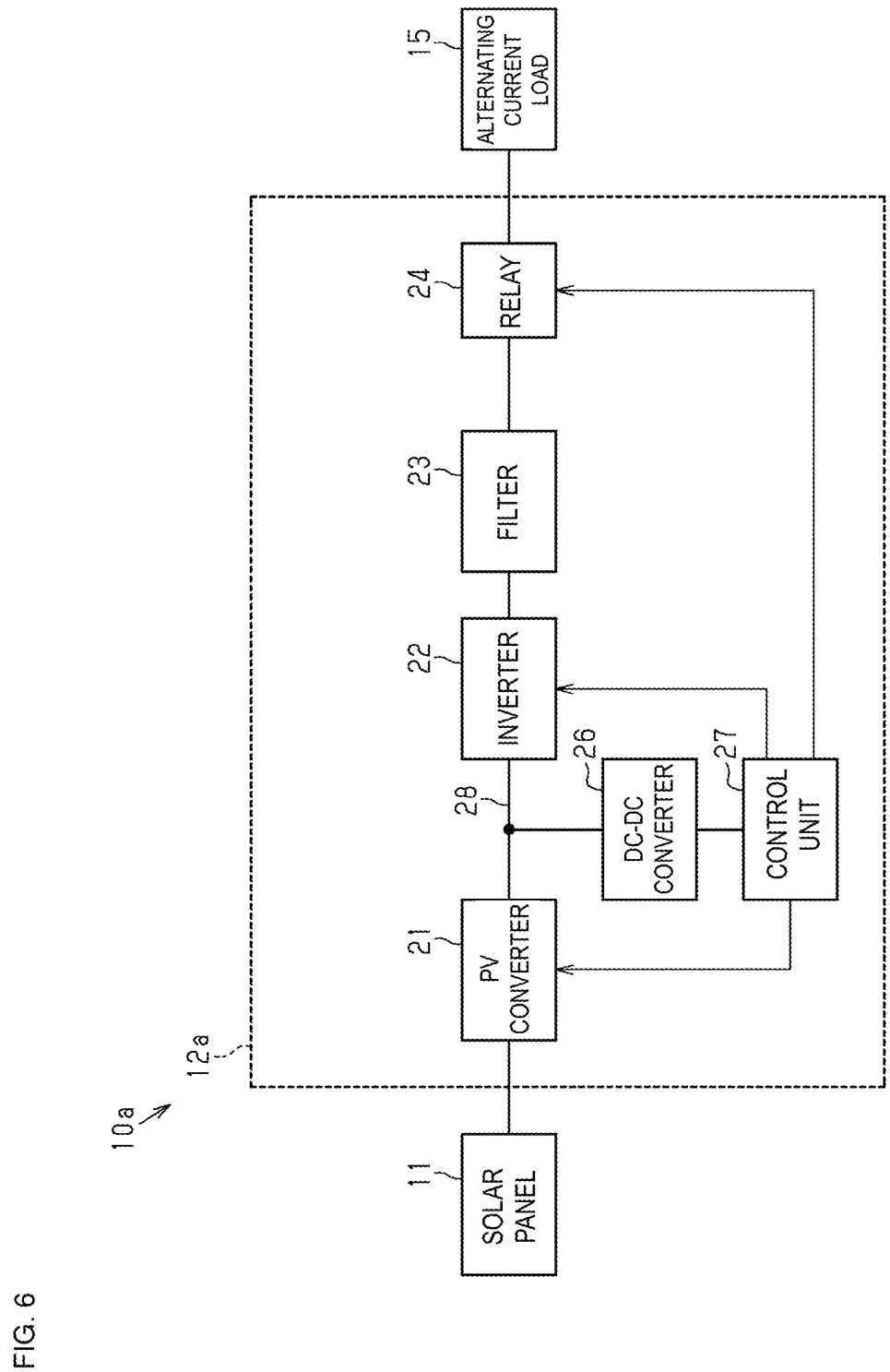
FIG. 6 is a schematic configuration diagram illustrating a solar power generation system of a modified example of a preferred embodiment of the present invention.

As illustrated in FIG. 6, a solar power generation system 10a preferably includes the solar panel 11 and a power conditioner 12a connected to the solar panel 11. The power conditioner 12a is assumed to be for off-grid use and not linked with a power system and is connected to the first alternating-current load 15 corresponding to an autonomous load. The first alternating-current load 15 is, for example, an indoor load connected to a distribution board. The indoor load may be, for example, electrical equipment of an ordinary house such as, for example, a light, a refrigerator, a washing machine, an air conditioner, a microwave oven, or the like. The aforementioned first alternating-current load 15 may alternatively be electrical equipment in a commercial facility or a factory.

The power conditioner 12a includes the PV converter 21, the inverter 22, the filter 23, the first relay 24, the DC-DC converter 26, and the controller 27. The PV converter 21, the inverter 22, and the DC-DC converter 26 are connected to each other via the direct-current voltage bus 28. The controller 27 controls the PV converter 21, the inverter 22, and the first relay 24.

The PV converter 21 is preferably, for example, a step-up chopper circuit that operates based on a control signal from the controller 27, boosts a direct-current voltage input from the solar panel 11, and outputs a boosted direct-current voltage. The inverter 22 is preferably a direct-current-and-alternating-current conversion circuit that operates based on a control signal from the controller 27 and converts the output voltage of the PV converter 21 into an alternating-current voltage. The filter 23 reduces a high frequency component of the alternating-current power output from the inverter 22.

The DC-DC converter 26 is preferably, for example, a step-down circuit and converts a direct-current voltage of the direct-current voltage bus 28 into a direct-current voltage suitable for operation of the controller 27. The controller 27 operates based on the direct-current voltage supplied from the DC-DC converter 26 and controls the PV converter 21, the inverter 22, and the first relay 24.

The first relay 24 is preferably, for example, an electromagnetic relay of normally open type, and the controller 27 controls the close state and the open state using a control signal. The first relay 24 connects and disconnects the inverter 22 to and from the first alternating-current load 15.

With closing the first relay 24, the power conditioner 12a (controller 27) enables the autonomous operation in which the first alternating-current load 15 is operated using the generated power of the solar panel 11.

Modified Example 2

Figure 7:
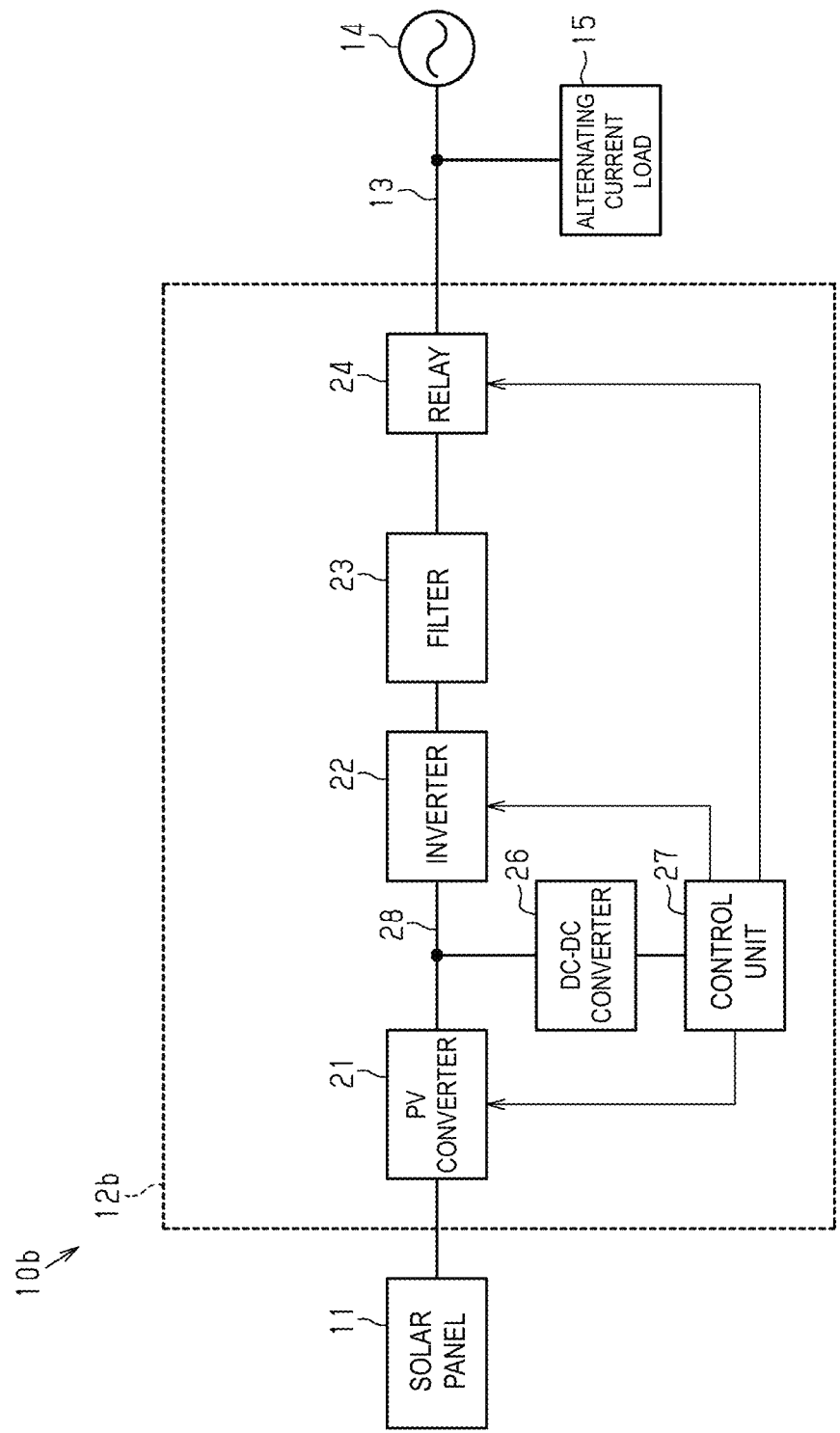
FIG. 7 is a schematic configuration diagram illustrating a solar power generation system of a modified example of a preferred embodiment of the present invention.

As illustrated in FIG. 7, a solar power generation system 10b preferably includes the solar panel 11 and a power conditioner 12b connected to the solar panel 11. In the present preferred embodiment, the power conditioner 12a is connected to the commercial power system 14 via the power line 13. The commercial power system 14 is a distribution system with which an electric power company transmits electric power. The first alternating-current load 15 is connected to the power line 13. In the present preferred embodiment, the first alternating-current load 15 is preferably, for example, an indoor load connected to a distribution board. The indoor load may be, for example, electrical equipment of an ordinary house such as a light, a refrigerator, a washing machine, an air conditioner, a microwave oven, or the like. Note that the aforementioned first alternating-current load 15 may alternatively be electrical equipment in a commercial facility or a factory.

The power conditioner 12b converts direct-current power generated at the solar panel 11 into alternating-current power and outputs the alternating-current power. Further, the power conditioner 12b links or disconnects the solar panel 11 to or from the commercial power system 14.

The power conditioner 12b preferably includes the PV converter 21, the inverter 22, the filter 23, the first relay (simply referred to as "relay") 24 corresponding to a system linkage relay, the DC-DC converter 26, and the controller 27. The PV converter 21, the inverter 22, and the DC-DC converter 26 are connected to each other via a direct-current voltage bus 28. The controller 27 controls the PV converter 21, the inverter 22, and the first relay 24.

The PV converter 21 is preferably, for example, a boost chopper circuit that operates based on a control signal from the controller 27, boosts a direct-current voltage input from the solar panel 11, and outputs a boosted direct-current voltage. The inverter 22 is preferably a direct-current-and-alternating-current conversion circuit that operates based on a control signal from the controller 27 and converts the output voltage of the PV converter 21 into an alternating-current voltage. The filter 23 reduces a high frequency component of the alternating-current power output from the inverter 22.

The DC-DC converter 26 is preferably, for example, a step-down circuit and converts a direct-current voltage of the direct-current voltage bus 28 into a direct-current voltage suitable for operation of the controller 27. The controller 27 operates based on the direct-current voltage supplied from the DC-DC converter 26 and controls the PV converter 21, the inverter 22, and the first relay 24.

The first relay 24 is preferably, for example, an electromagnetic relay of normally open type, and the controller 27 controls the close state and the open state using a control signal. The first relay 24 connects and disconnects the inverter 22 to and from the first alternating-current load 15. The solar power generation system 10b (solar panel 11) and the commercial power system 14 are linked by closing the first relay 24 and are disconnected by opening the first relay 24.

The controller 27 determines whether or not there is a power outage in the commercial power system 14. The power line 13 is provided with a voltage sensor not illustrated in the drawing and, based on a detection result of that power sensor, the controller 27 determines whether or not there is a power outage in the commercial power system 14. The controller 27 performs the linked operation when there is no power outage in the commercial power system 14 and opens the first relay 24 when there is a power outage in the commercial power system 14. In this case, unless a battery or the like is connected to the power conditioner 12b in addition to the PV converter 21, the power conditioner 12b stops the operation. When the commercial power system 14 is restored from a power outage, the controller 27 closes the first relay 24 and resumes the linked operation.

Second Preferred Embodiment

Hereinafter, a second preferred embodiment of the present invention will be described.

Note that in the second preferred embodiment, the same reference characters are assigned to the same or similar members and portions as those in the aforementioned first preferred embodiment, and some or all of their descriptions may be omitted.

Figure 8:
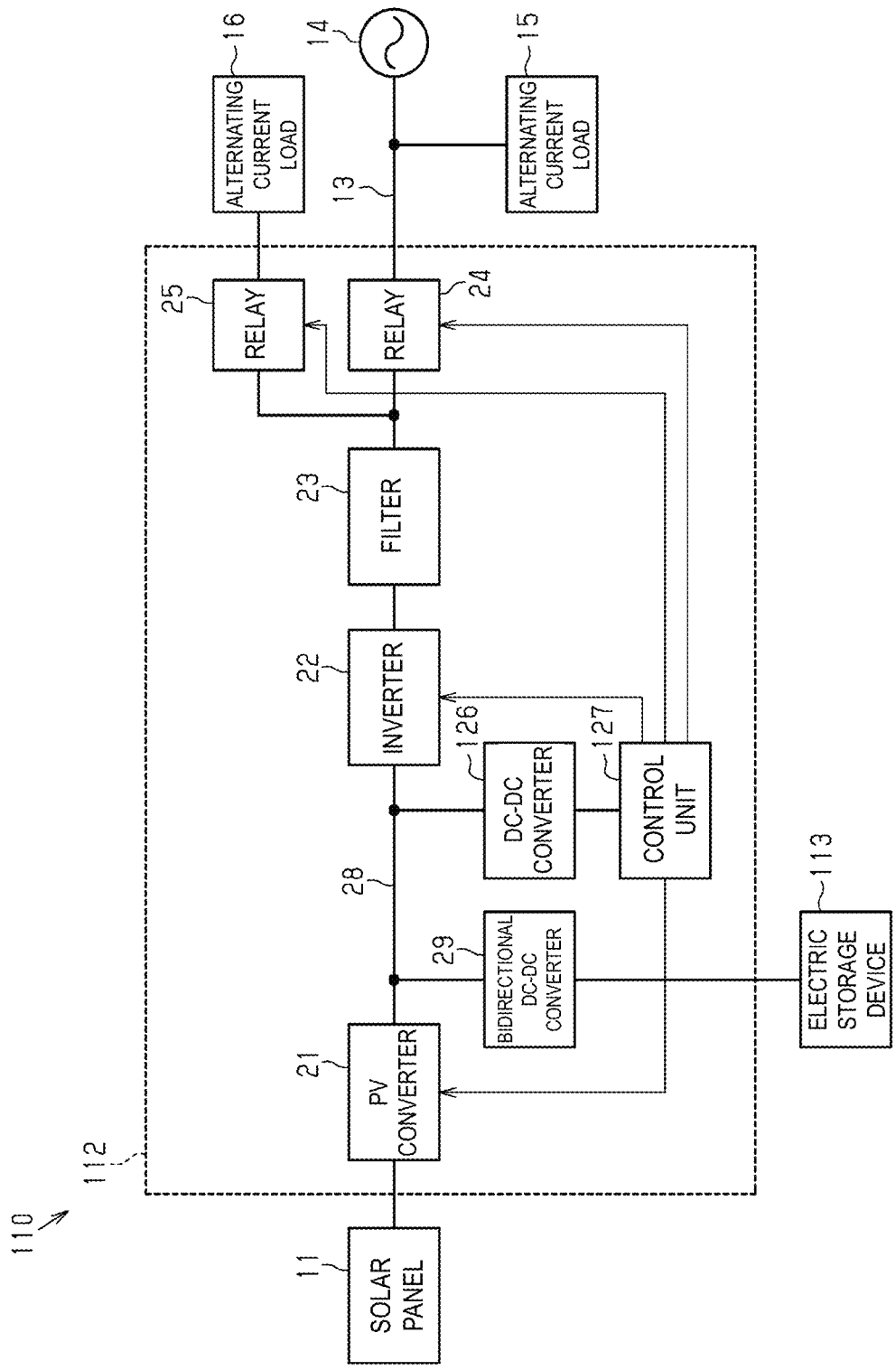
FIG. 8 is a schematic configuration diagram of a solar power generation system of a second preferred embodiment of the present invention.

As illustrated in FIG. 8, a solar power generation system 110 of the present preferred embodiment preferably includes the solar panel 11, a power conditioner 112 connected to the solar panel 11, and an electric storage device 113 connected to the power conditioner 112. The electric storage device 113 preferably includes a plurality of storage batteries.

The power conditioner 112 converts direct-current power generated at the solar panel 11 into alternating-current power and outputs the alternating-current power. Further, the power conditioner 112 links or disconnects the solar panel 11 to or from the commercial power system 14.

Further, the power conditioner 112 charges the electric storage device 113 with direct-current power generated at the solar panel 11. Further, the power conditioner 112 supplies the generated power of the solar panel 11 or discharged power of the electric storage device 113 to the first alternating-current load 15 and the second alternating-current load 16.

The power conditioner 112 preferably includes the PV converter 21, the inverter 22, the filter 23, the first relay (simply referred to as "relay") 24 corresponding to a system linkage relay, the second relay (simply referred to as "relay") 25 corresponding to an autonomous system relay, a DC-DC converter 126, a controller 127, and a bidirectional DC-DC converter 29. The PV converter 21, the inverter 22, and the DC-DC converter 126 are connected to each other via a direct-current voltage bus 28. A first terminal of the bidirectional DC-DC converter 29 is connected to the direct-current voltage bus 28, and a second terminal of the bidirectional DC-DC converter 29 is connected to the electric storage device 113. The controller 127 controls the PV converter 21, the inverter 22, the first relay 24, the second relay 25 and the bidirectional DC-DC converter 29.

Figure 9:
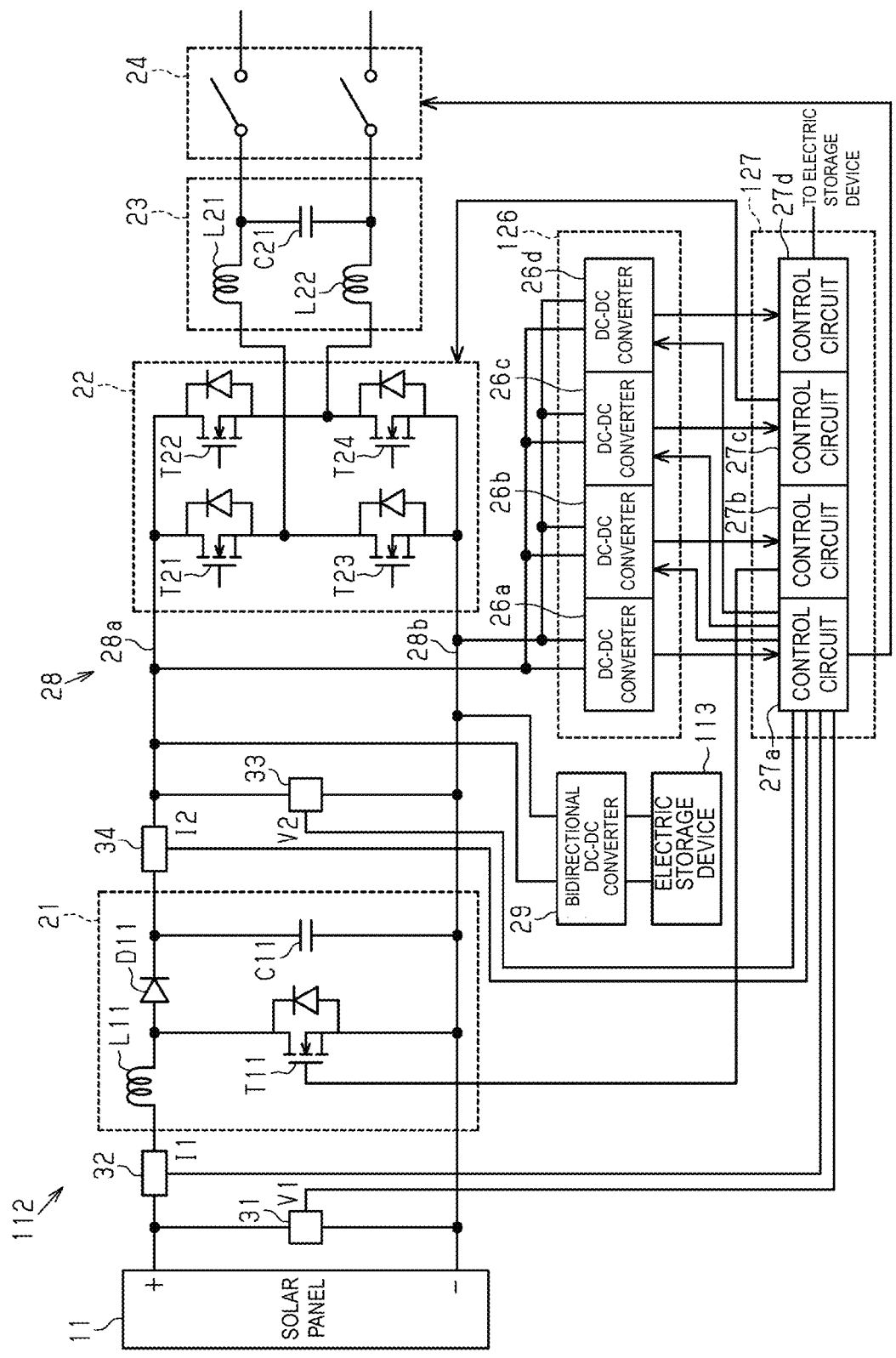
FIG. 9 is a schematic circuit diagram illustrating a power conditioner of the second preferred embodiment of the present invention.

As illustrated in FIG. 9, the controller 127 of the present preferred embodiment preferably includes a plurality (four in the present preferred embodiment) of control circuits 27a, 27b, 27c, and 27d. Further, the DC-DC converter 126 includes four DC-DC converters 26a, 26b, 26c, and 26d, which respectively correspond to the control circuits 27a, 27b, 27c, and 27d.

In the present preferred embodiment, the control circuit 27a is preferably a manager circuit that controls the entire power conditioner. The control circuit 27b is a circuit that controls the PV converter 21. Further, the control circuit 27c is a circuit that controls the inverter 22. The control circuit 27*d* is a circuit that controls the bidirectional DC-DC converter 29.

The DC-DC converters 26*a* to 26*d* are preferably, for example, step-down circuits of insulated type. The DC-DC converter 26*a* is always in operation and supplies a drive voltage, which is obtained by stepping down the direct-current voltage of the direct-current voltage bus 28, to the control circuit 27*a*. Activation and deactivation of the DC-DC converters 26*b* to 26*d* are controlled by the control circuit 27*a*. The activated DC-DC converters 26*b* to 26*d* supply drive voltages, which are obtained by stepping down the direct-current voltage of the direct-current voltage bus 28, to the control circuits 27*b* to 27*d*.

The control circuit 27*a* operates based on the drive voltage supplied from the DC-DC converter 26*a* and performs a start process, which will be described below. The control circuit 27*a* controls activation and deactivation of the DC-DC converters 26*b* to 26*d*. Further, the control circuit 27*a* controls activation and deactivation of the control circuits 27*b* to 27*d*.

The control circuit 27*a* causes the impedance of the DC-DC converter 126 to change and detects the output voltage and the output current of the solar panel 11, which are the input voltage V1 and the input current I1 of the PV converter 21. Further, based on a detection result, the control circuit 27*a* at least determines activation of the relay.

For example, by controlling activation and deactivation of the DC-DC converter 26*b* in the start process, the control circuit 27*a* causes the impedance of the DC-DC converter 126 to change and measures the current-voltage (I-V) characteristic of the solar panel 11. From the current-voltage characteristic, the control circuit 27*a* estimates the generated power of the solar panel 11. Further, when the estimated generated power of the solar panel 11 is equal to or greater than the operational power, the control circuit 27*a* determines that the power conditioner 12 can be operated and that the relay (first relay 24, second relay 25) is to be in the close state. Accordingly, when a sufficient generated power is obtained from the solar panel 11, the alternating-current power based on the generated power of the solar panel 11 can be supplied to the first alternating-current load 15 and the second alternating-current load 16.

Whereas, when the estimated generated power is less than the operational power, the control circuit 27*a* does not put the relay (first relay 24) into the close state. In this case, the control circuit 27*a* does not activate the control circuit 27*b*, that is, does not activate the PV converter 21. Further, the control circuit 27*a* determines whether or not supply of power from the electric storage device 113 is possible. For example, the control circuit 27*a* determines whether or not the electric storage device 113 can discharge based on the amount of stored charge (for example, state of charge (SOC)) in the electric storage device 113. When determined that discharge is possible, the control circuit 27*a* activates the control circuit 27*d*. The control circuit 27*d* controls the bidirectional DC-DC converter 29 in such a manner as to output a desired direct-current voltage to the direct-current voltage bus 28 based on the direct-current voltage discharged from the electric storage device 113.

Further, the control circuit 27*a* activates the control circuit 27*c* and puts the relay (first relay 24, second relay 25) into the close state. The control circuit 27*c* controls the inverter 22 to generate alternating-current voltage based on the direct-current voltage of the direct-current voltage bus 28. This alternating-current voltage is supplied to the first alternating-current load 15 and the second alternating-current load 16 via the first relay 24 and the second relay 25 that are in the close state, respectively.

As described above, the present preferred embodiment produces advantageous effects similar to those of the first preferred embodiment are obtained. Further, the power conditioner 112 of the present preferred embodiment includes the bidirectional DC-DC converter 29 connected to the electric storage device 113. The controller 127 includes the control circuit 27*d* that controls the bidirectional DC-DC converter 29. When the generated power (estimated value) of the solar panel 11 is less than the operational power, the control circuit 27*a* activates the control circuit 27*d* and supplies the direct-current voltage to the direct-current voltage bus 28 using the discharged power from the electric storage device 113 using the bidirectional DC-DC converter 29. The control circuit 27*a* activates the control circuit 27*c* and causes the inverter 22 to convert the direct-current voltage of the direct-current voltage bus 28 into the alternating-current voltage. Further, by putting the relay (first relay 24, the second relay 25) into the close state, the control circuit 27*a* enables to supply the alternating-current voltage to the first alternating-current load 15 and the second alternating-current load 16. Further, electric power selling from the commercial power system 14 can be suppressed.

Note that each of the foregoing preferred embodiments and modifications thereof may be implemented in the following manners.

In the first preferred embodiment, the PV converter 21 and the inverter 22 may alternatively be controlled by a single control circuit. In this case, the DC-DC converter 26 includes a single DC-DC converter corresponding to the single control circuit. The control circuit 27*a* controls activation and deactivation of the single DC-DC converter and estimates the generated power of the solar panel 11.

In the first preferred embodiment, the impedance of the DC-DC converter 26 may be caused to change by controlling activation and deactivation of the DC-DC converter 26*c* in place of the DC-DC converter 26*b*. Further, the impedance of the DC-DC converter 26 may be caused to change by controlling activation and deactivation of two DC-DC converters 26*b* and 26*c*. In this case, the impedance of the DC-DC converter 26, which is the load for the solar panel 11, changes between when one DC-DC converter 26*a* is in operation and when three DC-DC converters 26*a* to 26*c* are in operation. The number of the DC-DC converters to be controlled corresponds to the amount of load for the solar panel 11 and power consumption. By increasing the amount of load to be caused to change, the output characteristic (I-V characteristic) of the solar panel 11 and accuracy of the estimated generated power can be improved. Similarly, in the second preferred embodiment, the accuracy of the estimated generated power can be improved by appropriately changing the number of the DC-DC converters to be activated in the start process.

In the second preferred embodiment, as is the case with the modified example 1 of the first preferred embodiment, the power conditioner 112 may be connected to the first alternating-current load 15 corresponding to the autonomous load assuming the off-grid use in which the power conditioner is not linked with a power system. Further, in the second preferred embodiment, as is the case with the modified example 2 of the first preferred embodiment, a configuration including the first relay 24 but not including the second relay 25 may be used.

The controller 27, 127 and the control circuit 27*a*, 27*b*, 27*c*, 27*d* of the preferred embodiments may include, for example, one or more tangible computer-readable memories storing computer readable commands configured to implement functions of the controller and the control circuit of the preferred embodiments and one or more processors configured to execute these computer readable commands. The controller and the control circuits of the preferred embodiments may alternatively be an integrated circuit such as an application specific IC (ASIC) or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A solar power generation system comprising:
    a solar panel;
    a PhotoVoltaic (PV) converter connected to the solar panel;
    an inverter that converts a direct-current voltage output from the PV converter to an alternating-current voltage;
    a first relay that connects and disconnects the inverter to and from a first alternating-current load, to which the alternating-current voltage is supplied;
    a controller that controls the PV converter and the inverter; and
    a DC-DC converter that converts the direct-current voltage output from the PV converter into a drive voltage of the controller; wherein
    in a start process, the controller causes an impedance of the DC-DC converter to change, detects an input voltage and an input current of the PV converter or an output voltage and an output current of the PV converter, and at least determines whether or not the first relay is to be in a close state according to those values;
    the controller includes a primary control circuit that performs the start process, a first control circuit that controls the PV converter, and a second control circuit that controls the inverter;
    the DC-DC converter includes a primary converter that generates a drive voltage of the primary control circuit, a first converter that generates a drive voltage of the first control circuit, and a second converter that generates a drive voltage of the second control circuit; and
    the primary control circuit controls activation and deactivation of the first converter and the second converter, the primary control circuit causing the impedance of the DC-DC converter to change in the start process by at least controlling activation and deactivation of the first converter.

2. The solar power generation system according to claim 1, wherein the first alternating-current load is connected to a power system.

3. The solar power generation system according to claim 1, further comprising:
    a second relay that connects and disconnects the inverter to and from a second alternating-current load, to which the alternating-current voltage is supplied.

4. The solar power generation system according to claim 3, wherein the controller estimates a generated power of the solar panel from the input voltage and the input current of the PV converter or the output voltage and the output current of the PV converter, compares the estimated generated power with an operational power, and determines whether or not the first relay or the second relay is to be in the close state.

5. The solar power generation system according to claim 4, further comprising:
    a bidirectional DC-DC converter, a first terminal of the bidirectional DC-DC converter being connected to a direct-current voltage bus arranged between the PV converter and the inverter; and
    an electric storage device connected to a second terminal of the bidirectional DC-DC converter; wherein
    when the generated power of the solar panel is less than the operational power, the controller deactivates the PV converter and outputs, to the direct-current voltage bus, a direct-current voltage based on a storage voltage of the electric storage device by activating the bidirectional DC-DC converter.

6. The solar power generation system according to claim 3, wherein the first relay and the second relay are both normally open electromagnetic relays.

7. The solar power generation system according to claim 1, further comprising:
    a bidirectional DC-DC converter, a first terminal of the bidirectional DC-DC converter being connected to a direct-current voltage bus arranged between the PV converter and the inverter; and
    an electric storage device connected to a second terminal of the bidirectional DC-DC converter.

8. The solar power generation system according to claim 1, wherein the PV converter is a step-up chopper circuit that operates based on a control signal received from the controller.

9. The solar power generation system according to claim 1, wherein the DC-DC converter is defined by a step-down circuit.

10. A power conditioner that converts a direct-current voltage input from a solar panel into an alternating-current voltage and outputs to a first alternating-current load, the power conditioner comprising:
    a PhotoVoltaic (PV) converter connected to the solar panel;
    an inverter that converts a direct-current voltage output from the PV converter to the alternating-current voltage;
    a first relay that connects and disconnects the inverter to and from the first alternating-current load;
    a controller that controls the PV converter and the inverter; and
    a DC-DC converter that converts the direct-current voltage output from the PV converter into a drive voltage of the controller; wherein
    in a start process, the controller causes an impedance of the DC-DC converter to change, detects an input voltage and an input current of the PV converter or an output voltage and an output current of the PV converter, and at least determines whether or not the first relay is to be in a close state according to those values;
    the controller includes a primary control circuit that performs the start process, a first control circuit that controls the PV converter, and a second control circuit that controls the inverter;
    the DC-DC converter includes a primary converter that generates a drive voltage of the primary control circuit, a first converter that generates a drive voltage of the first control circuit, and a second converter that generates a drive voltage of the second control circuit; and
    the primary control circuit controls activation and deactivation of the first converter and the second converter, the primary control circuit causing the impedance of the DC-DC converter to change in the start process by at least controlling activation and deactivation of the first converter.

11. The power conditioner according to claim 10, wherein the first alternating-current load is connected to a power system.

12. The power conditioner according to claim 10, further comprising:
   a second relay that connects and disconnects the inverter to and from a second alternating-current load, to which the alternating-current voltage is supplied.

13. The power conditioner according to claim 10, further comprising:
   a bidirectional DC-DC converter, a first terminal of the bidirectional DC-DC converter being connected to a direct-current voltage bus arranged between the PV converter and the inverter, a second terminal of the bidirectional DC-DC converter being connected to an electric storage device.

14. The power conditioner according to claim 10, further comprising:
   a first voltage sensor connected between input terminals of the PV converter and outputs a signal associated with an input voltage of the PV converter to the controller; and
   a second voltage sensor connected to the DC-DC converter.

15. The power conditioner according to claim 14, further comprising:
   a first current sensor installed between a positive-electrode terminal of the solar panel and the PV converter; and
   a second current sensor installed after the PV converter.

* * * * *